US009327676B1

United States Patent
Wu

(10) Patent No.: US 9,327,676 B1
(45) Date of Patent: May 3, 2016

(54) SAFETY MECHANISM OF VEHICLE AND DEPLOYMENT METHOD THEREOF

(71) Applicant: HON HAI PRECISION INDUSTRY CO., LTD., New Taipei (TW)

(72) Inventor: E-In Wu, New Taipei (TW)

(73) Assignee: HON HAI PRECISION INDUSTRY CO., LTD., New Taipei (TW)

( * ) Notice: Subject to any disclaimer, the term of this patent is extended or adjusted under 35 U.S.C. 154(b) by 0 days.

(21) Appl. No.: 14/595,218

(22) Filed: Jan. 13, 2015

(51) Int. Cl.
*B60R 21/36* (2011.01)
*B60R 21/34* (2011.01)
*B60R 21/0134* (2006.01)
*B60Q 5/00* (2006.01)
*B60Q 1/52* (2006.01)

(52) U.S. Cl.
CPC ............ *B60R 21/36* (2013.01); *B60Q 1/525* (2013.01); *B60Q 5/006* (2013.01); *B60R 21/0134* (2013.01); *B60R 2021/346* (2013.01)

(58) Field of Classification Search
CPC .... B60R 21/0134; B60R 21/34; B60R 21/36; B60R 2021/002; B60R 2021/0069; B60R 2021/0074; B60R 2021/346; B60R 19/54; B60Q 5/006; B60Q 1/525
See application file for complete search history.

(56) References Cited

U.S. PATENT DOCUMENTS

| 1,368,142 A | * | 2/1921 | Halliday | ............ 293/37 |
| 7,757,804 B1 | * | 7/2010 | Li | ............ 180/274 |
| 8,463,502 B2 | * | 6/2013 | Baumann et al. | ............ 701/45 |

FOREIGN PATENT DOCUMENTS

| DE | 102011114298 A1 | * | 3/2013 | |
| JP | 2005199787 A | * | 7/2005 | ............ B60R 21/00 |
| JP | 2006036184 A | * | 2/2006 | |
| JP | 2006273139 A | * | 10/2006 | |
| JP | 2006273282 A | * | 10/2006 | |
| JP | 2009035113 A | * | 2/2009 | |
| JP | 2009234452 A | * | 10/2009 | |

\* cited by examiner

*Primary Examiner* — Laura Freedman
(74) *Attorney, Agent, or Firm* — Novak Druce Connolly Bove + Quigg LLP

(57) ABSTRACT

A method for deploying a safety mechanism of a vehicle includes detecting an object or person within a predetermined vicinity of the vehicle, transitioning a transitioning assembly of the safety mechanism from a horizontal orientation to a vertical orientation when an object or person is detected within the predetermined vicinity, detecting whether the object or person enters into a danger zone in front of a rear wheel of the vehicle, deploying a first airbag in front of the rear wheel of the vehicle when the object or person enters into the space in front of the rear wheel, and deploying a second airbag and extending a blocking plate in front of the rear wheel of the vehicle. The second airbag is positioned in front of the blocking plate and causes the blocking plate to extend.

20 Claims, 10 Drawing Sheets

SAFETY MECHANISM OF VEHICLE AND DEPLOYMENT METHOD THEREOF

FIELD

The subject matter herein generally relates to safety mechanisms of vehicles, and more particularly to a safety mechanism for preventing an object or person from being run over by a rear wheel of a vehicle.

BACKGROUND

Nowadays, more and more vehicles are equipped with advanced driver assistance systems (ADAS). ADAS includes a plurality of detection and control systems for improving safety of the vehicle.

BRIEF DESCRIPTION OF THE DRAWINGS

Implementations of the present technology will now be described, by way of example only, with reference to the attached figures.

DETAILED DESCRIPTION

Figure 1:
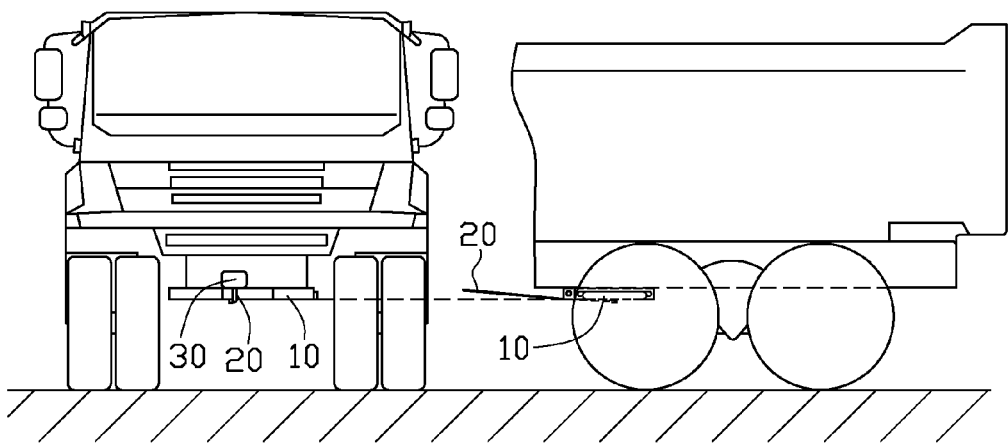
FIG. 1 is a diagrammatic view of an embodiment of a safety mechanism of a vehicle.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, methods, procedures and components have not been described in detail so as not to obscure the related relevant feature being described. The drawings are not necessarily to scale and the proportions of certain parts may be exaggerated to better illustrate details and features. The description is not to be considered as limiting the scope of the embodiments described herein.

Several definitions that apply throughout this disclosure will now be presented.

The term "coupled" is defined as connected, whether directly or indirectly through intervening components, and is not necessarily limited to physical connections. The connection can be such that the objects are permanently connected or releasably connected. The term "comprising" means "including, but not necessarily limited to"; it specifically indicates open-ended inclusion or membership in a so-described combination, group, series and the like.

Figure 2:
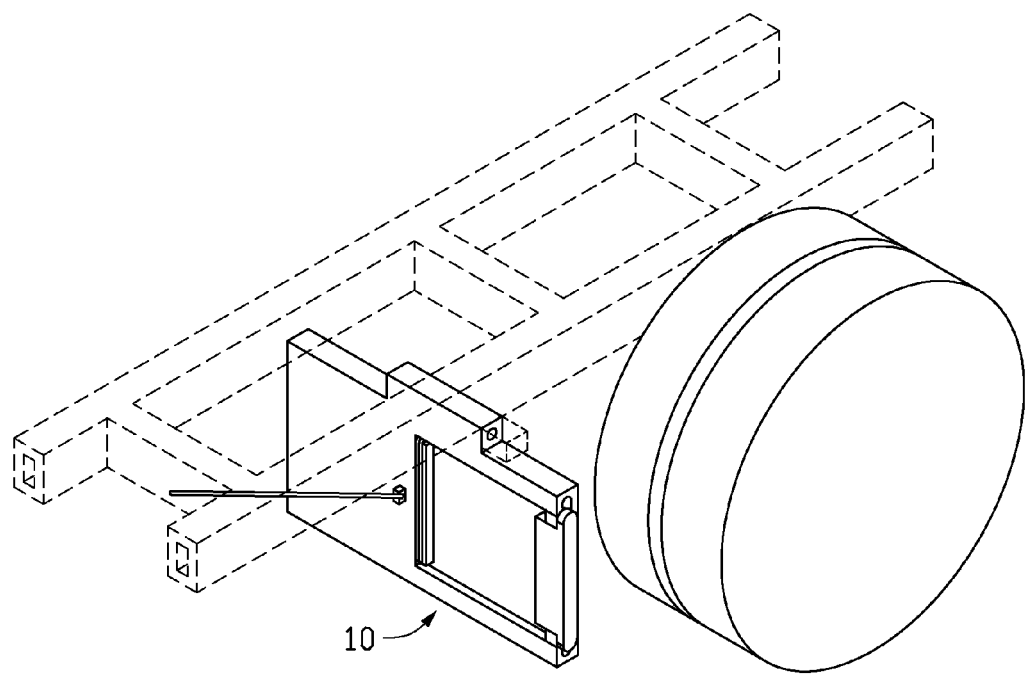
FIG. 2 is a diagrammatic view of a transitioning assembly of the safety mechanism.

FIGS. 1 and 2 illustrate an exemplary embodiment of a safety mechanism of a vehicle. The safety mechanism can include a transitioning assembly 10, a transitioning cable 20, and a motor 30. The vehicle can be a large vehicle, such as a cargo truck. The transitioning assembly 10 can be located under a crossbeam of the vehicle and be located adjacent to a rear wheel of the vehicle. The safety mechanism can prevent an object or person from being run over by the rear wheel of the vehicle when the object or person enters into a space underneath the vehicle. The safety mechanism can be employed on both lateral sides of the vehicle. The safety mechanism can be coupled to and controlled by built-in detection and control systems of the vehicle. For example, the safety mechanism can be coupled to and controlled by advanced driver assistance systems (ADAS) of the vehicle known in the art. In at least one embodiment, the safety mechanism is implemented when the vehicle makes a turn. For simplicity and clarity of illustration, only the safety mechanism on one side of the vehicle will be described.

Figure 3:
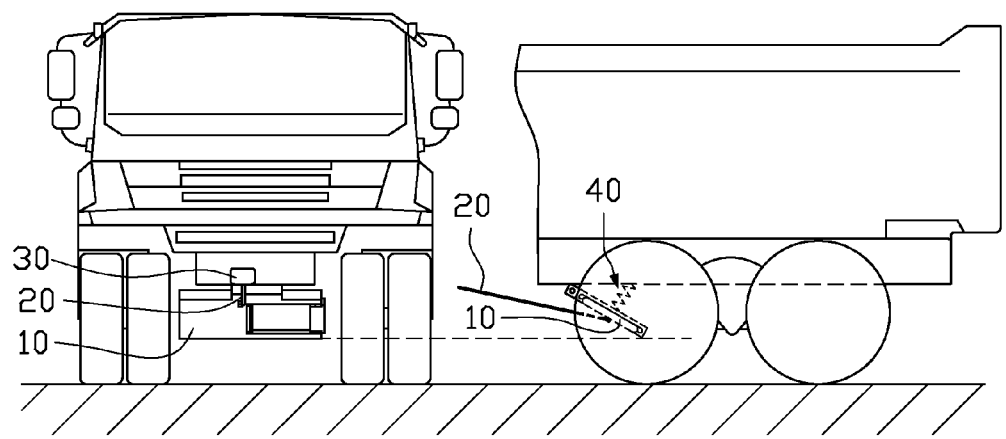
FIG. 3 is similar to FIG. 1.
Figure 4:
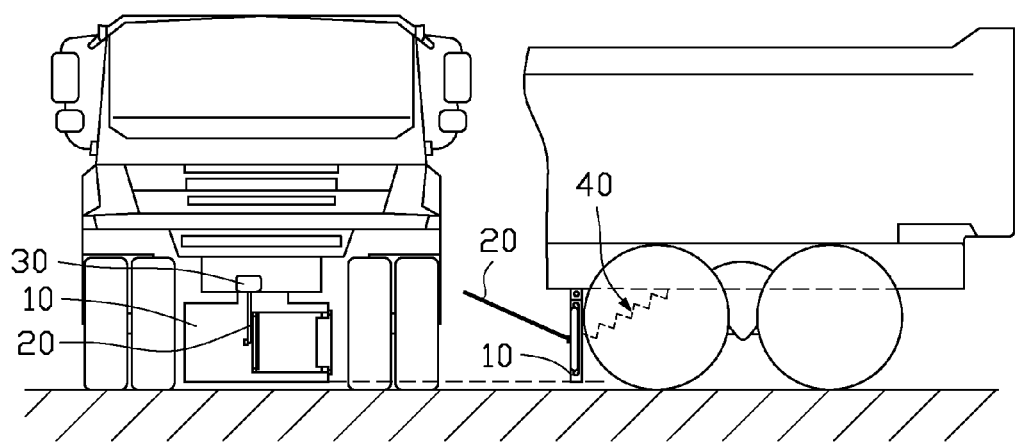
FIG. 4 is similar to FIG. 1.

Referring to FIGS. 1 and 3-4, the transitioning assembly 10 can be transitioned between a horizontal orientation and a vertical orientation. The transitioning cable 20 can be coupled between the motor 30 and the transitioning assembly 10. The motor 30 can pull the transitioning cable 20 to transition the transitioning assembly 10 from the horizontal orientation to the vertical orientation. An elastic member 40 can be coupled between the transitioning assembly 10 and the crossbeam of the vehicle. When the motor releases tension on the transitioning cable 20, the elastic member 40 can restore to transition the transitioning assembly 10 back to the horizontal orientation.

Figure 5:
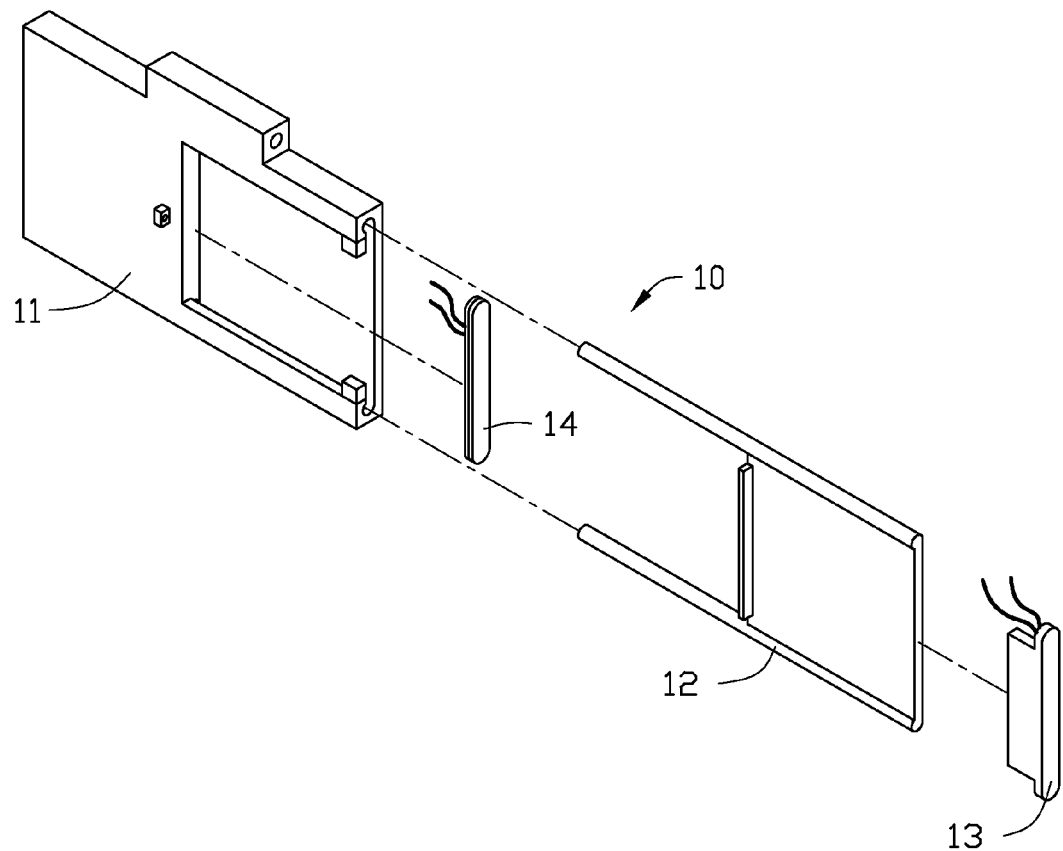
FIG. 5 is an exploded isometric view of the transitioning assembly.
Figure 6:
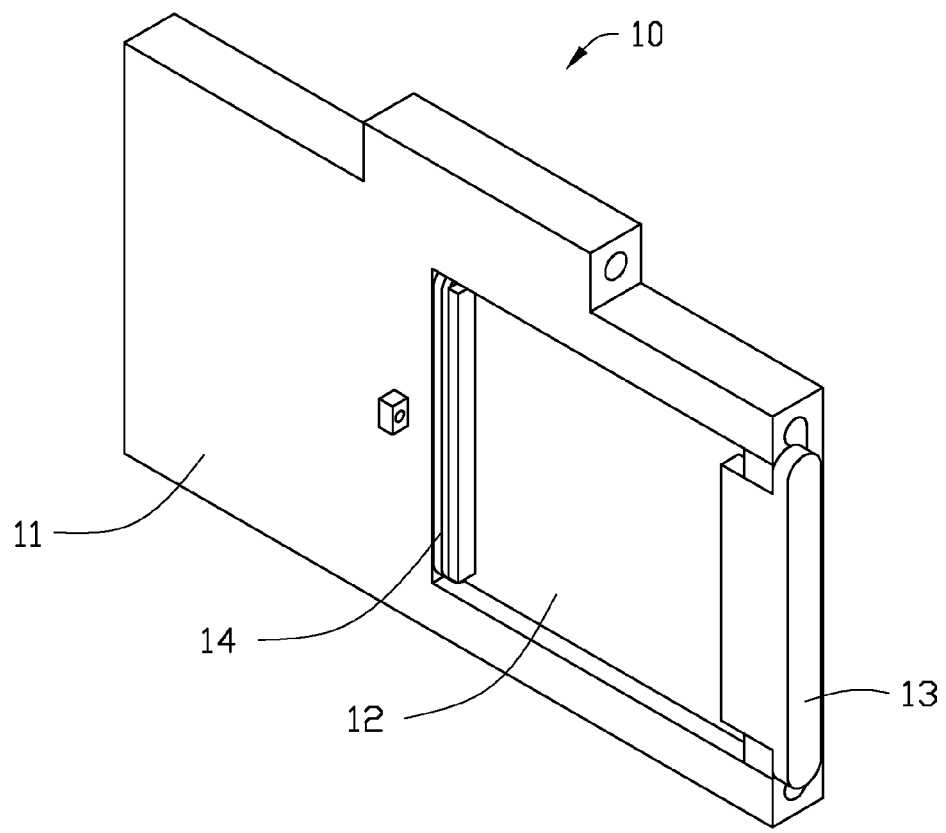
FIG. 6 is an assembly isometric view of the transitioning assembly.

Referring to FIGS. 5-6, the transitioning assembly 10 can include a main housing 11, a blocking plate 12, a first airbag 13, and a second airbag 14. A first side of the main housing 11 can be coupled to the transitioning cable, and a second side of the main housing 11 can be coupled to the elastic member. The main housing 11 can house the blocking plate 12, the first airbag 13, and the second airbag 14. The blocking plate 12 can transition from a retracted state to an extended state. The blocking plate 12 is in the retracted state when the second airbag 14 is not deployed. The blocking plate 12 is transitioned to the extended state by deployment of the second airbag 14.

The transitioning assembly 10 can be transitioned to the vertical orientation when an object or person is detected within a predetermined vicinity of the vehicle. The predetermined vicinity can be determined by the ADAS of the vehicle. When the object or person is detected within the predetermined vicinity, the vehicle can send out an alarm to alarm the object or person to move out of the predetermined vicinity. The alarm can be a light, an audio, or the like. If the object or person moves out of the predetermined vicinity, the transitioning assembly 10 can be returned to the horizontal orientation.

Figure 7:
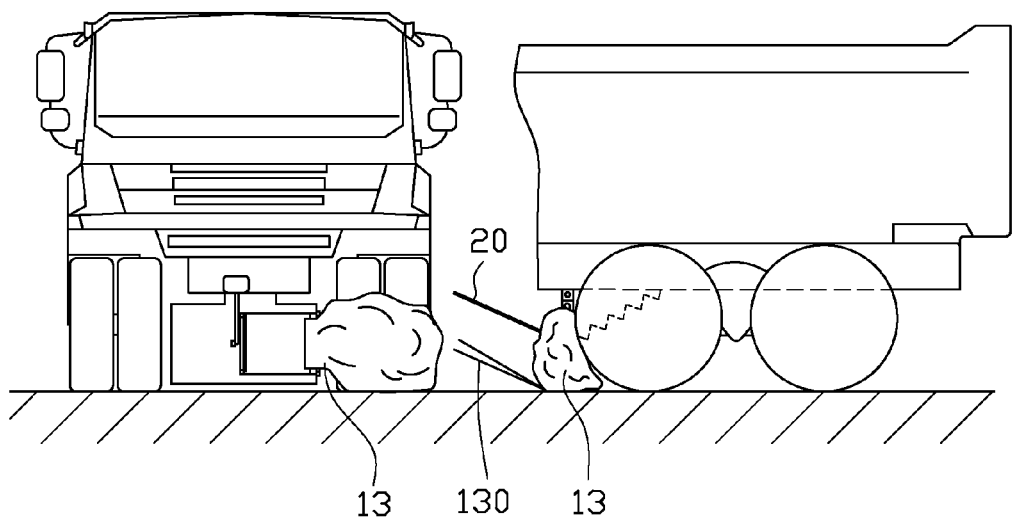
FIG. 7 is a diagrammatic view of an embodiment of a process of deploying a first airbag of the transitioning assembly.

Referring to FIG. 7, if the object or person does not move out of the predetermined vicinity of the vehicle and enters into a danger zone in front of the rear wheel of the vehicle, the first airbag 13 can be deployed. The first airbag 13 is deployed in front of the rear wheel of the vehicle to prevent the object or person from being run over by the rear wheel. A bottom portion of the first airbag 13 can be coupled to at least one first dragging cable 130. The first dragging cable 130 can pull the first airbag 13 taut as the vehicle moves forward when the first airbag 13 is deflated. Thus, the first airbag 13 can push the object or person out of the danger zone.

Figure 8:
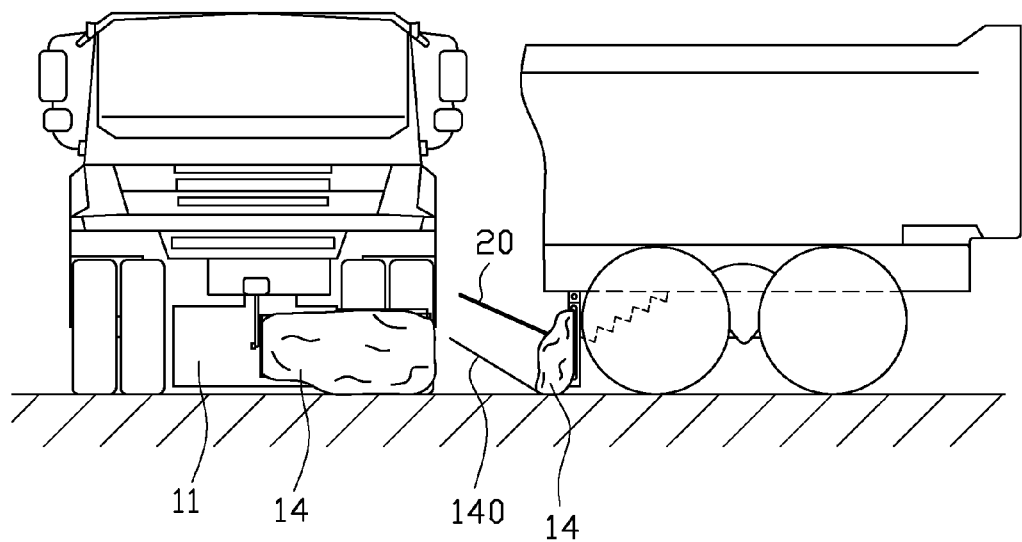
FIG. 8 is a diagrammatic view of an embodiment of a process of deploying a second airbag of the transitioning assembly.
Figure 9:
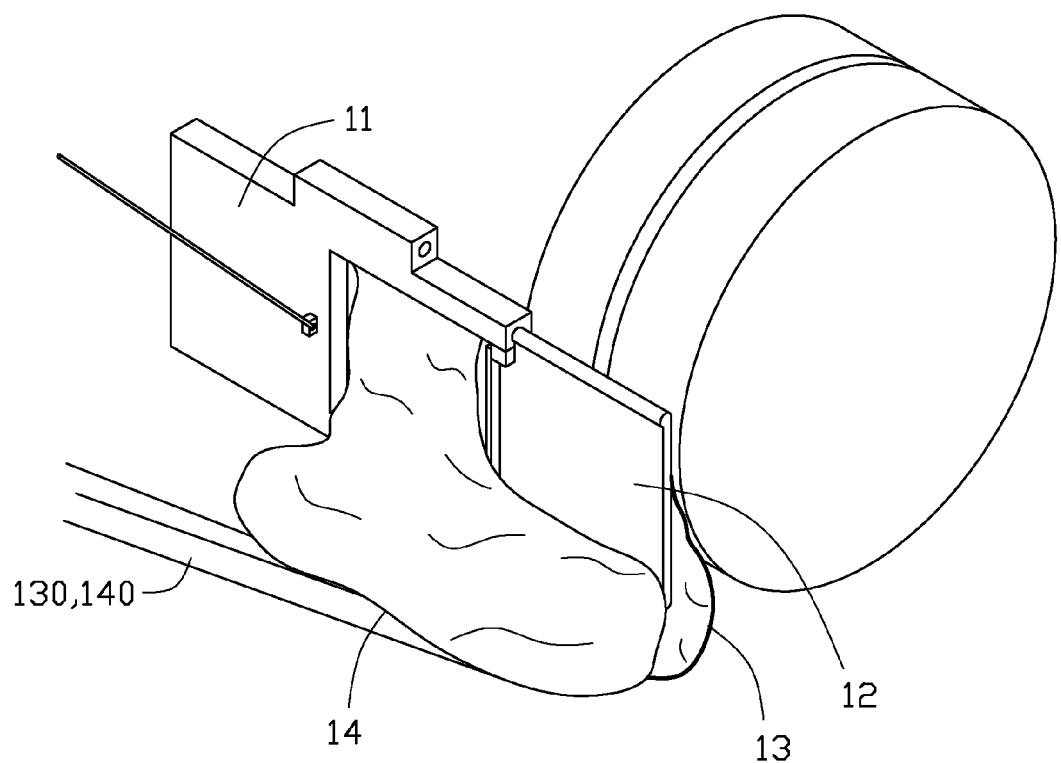
FIG. 9 is a diagrammatic view of the transitioning assembly with the second airbag deployed.

Referring to FIGS. 8-9, after the object or person is moved out of the danger zone, the second airbag 14 can be deployed. The second airbag is deployed from a side of the main housing 11 facing toward the front of the vehicle. The deployment of the second airbag 14 causes the blocking plate 12 to extend to the extended state. The blocking plate 12 in the extended state is positioned in front of the rear wheel of the vehicle. The second airbag 14 is positioned in front of the blocking plate 12. A bottom portion of the second airbag 14 can be coupled to at least one second dragging cable 140. The second dragging cable 140 can pull the second airbag 14 taut as the vehicle moves forward when the second airbag 14 is deflated. Thus, the second airbag 14 can form a cushion on the blocking plate 12 for cushioning an impact on the object or person. The bottom portion of the second airbag 14 can also form a cushion between the object or person and the ground. In at least one embodiment, a time of inflating the first and second airbags is ½s of a second, and a speed of inflating the first and second airbags is 322 kilometers per hour.

Figure 10:
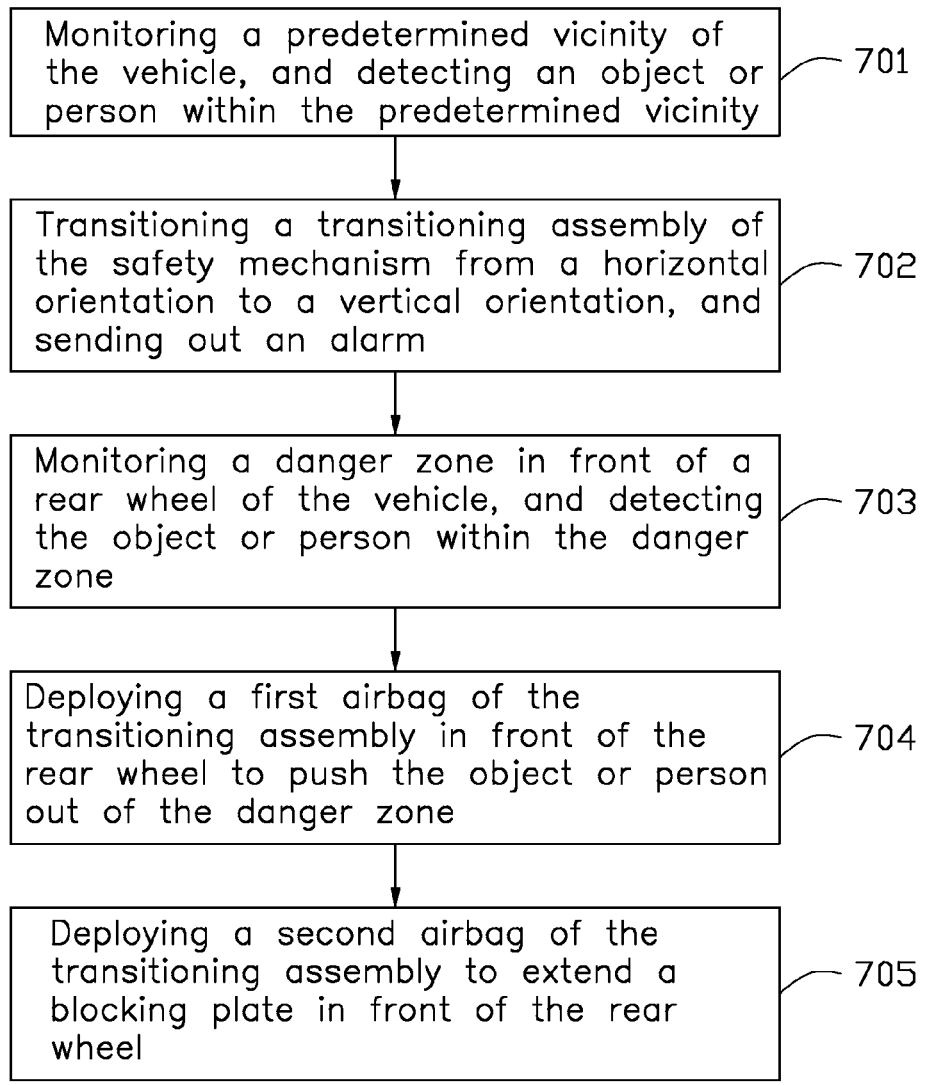
FIG. 10 is a flowchart of an embodiment of a method for deploying a safety mechanism of a vehicle.

FIG. 10 illustrates a flowchart of an exemplary method for deploying a safety mechanism of a vehicle. The example method is provided by way of example, as there are a variety of ways to carry out the method. The method described below can be carried out using the configurations illustrated in FIGS. 1-6, for example, and various elements of these figures are referenced in explaining the example method. Each block shown in FIG. 10 represents one or more processes, methods, or subroutines carried out in the example method. Furthermore, the illustrated order of blocks is by example only, and the order of the blocks can be changed. Additional blocks may be added or fewer blocks may be utilized, without departing from this disclosure. The example method can begin at block 701.

At block 701, a predetermined vicinity of the vehicle is monitored. If an object or person is detected to have entered the predetermined vicinity, block 702 is implemented.

At block 702, a transitioning assembly of the safety mechanism is transitioned from a horizontal orientation to a vertical orientation, and an alarm is sent out to alarm the object or person to move out of the predetermined vicinity. If the object or person moves out of the predetermined vicinity, block 701 is implemented. If the object or person does not move out of the predetermined vicinity, block 703 is implemented.

At block 703, a danger zone in front of a rear wheel of the vehicle is monitored. If the object or person is detected to have entered the danger zone, block 704 is implemented. Otherwise, the procedure ends.

At block 704, a first airbag of the transitioning assembly is deployed in front of the rear wheel to push the object or person out of the danger zone.

At block 705, a second airbag of the transitioning assembly is deployed to extend a blocking plate in front of the rear wheel. The second airbag forms a cushion on the blocking plate and forms a cushion on the ground.

The embodiments shown and described above are only examples. Even though numerous characteristics and advantages of the present technology have been set forth in the foregoing description, together with details of the structure and function of the present disclosure, the disclosure is illustrative only, and changes may be made in the detail, including in matters of shape, size and arrangement of the parts within the principles of the present disclosure up to, and including, the full extent established by the broad general meaning of the terms used in the claims.

What is claimed is:

1. A safety mechanism of a vehicle, the safety mechanism comprising:
   a transitioning assembly configured to transition between a horizontal orientation and a vertical orientation;
   a transitioning cable coupled to the transitioning assembly and configured to cause the transitioning assembly to transition from the horizontal orientation to the vertical orientation; and
   a motor coupled to the transitioning cable and configured to pull the transitioning cable to cause the transitioning assembly to transition from the horizontal orientation to the vertical orientation;
   the transitioning assembly comprising:
      a blocking plate configured to transition from a refracted state to an extended state;
      a first airbag configured to inflate when the transitioning assembly is in the vertical orientation and the blocking plate is in the retracted state;
      a second airbag configured to inflate after the first airbag inflates and cause the blocking plate to transition to the extended state; and
      a main housing coupled to the transitioning cable and configured to house the blocking plate, first airbag, and second airbag; wherein:
      the transitioning assembly is located under a crossbeam of the vehicle;
      the first airbag, when deployed, is positioned in front of a rear wheel of the vehicle;
      the blocking plate in the extended state is positioned in front of the rear wheel of the vehicle; and
      the second airbag, when deployed, is positioned in front of the blocking plate.

2. The safety mechanism as in claim 1, wherein the safety mechanism is coupled to advanced driver assistance systems for controlling operation of the safety mechanism.

3. The safety mechanism as in claim 2, wherein the motor is controlled to pull the transitioning cable to transition the transitioning assembly from the horizontal orientation to the vertical orientation when an object or person is detected within a predetermined vicinity of the vehicle.

4. The safety mechanism as in claim 3, wherein when the object or person is detected to have entered into a danger zone in front of the rear wheel, the first airbag is deployed.

5. The safety mechanism as in claim 4, further comprising at least one first dragging cable; the at least one first dragging cable is coupled to a bottom portion of the first airbag and configured to pull the first airbag taut as the vehicle moves forward when the first airbag is deflated.

6. The safety mechanism as in claim 4, wherein:
   when the object or person is detected to have been cleared away from the danger zone in front of the rear wheel, the second airbag is deployed;
   the deployment of the second airbag causes the blocking plate to transition to the extended state;
   when the blocking plate is in the extended state, the blocking plate is positioned in front of the rear wheel; and
   the second airbag is positioned in front of the blocking plate.

7. The safety mechanism as in claim 6, wherein the second airbag is deployed from a side of the main housing facing toward the front of the vehicle.

8. The safety mechanism as in claim 6, further comprising at least one second dragging cable; the at least one second dragging cable is coupled to a bottom portion of the second airbag and configured to pull the second airbag taut as the vehicle moves forward when the second airbag is deflated.

9. The safety mechanism as in claim 3, further comprising an elastic member coupled between the main housing and the crossbeam of the vehicle; the elastic member is stretched when the transitioning cable pulls the main housing to transition the transitioning assembly from the horizontal orientation to the vertical orientation; the motor releases tension on the transitioning cable when the object or person moves out of the predetermined vicinity of the vehicle; and the elastic member restores the transitioning assembly to return to the horizontal orientation after the tension on the transitioning cable is released.

10. The safety mechanism as in claim 3, further comprising an alarming device configured to alarm the object or person to move out of the predetermined vicinity of the vehicle.

11. The safety mechanism as in claim 3, wherein the predetermined vicinity of the vehicle is monitored when the vehicle makes a turn.

12. The safety mechanism as in claim 1, wherein:
the vehicle comprises a plurality of transitioning assemblies, each transitioning assembly being located on one corresponding side of the vehicle and;
each transitioning assembly is deployed on the corresponding side of the vehicle.

13. The safety mechanism as in claim 1, wherein:
the vehicle comprises one transitioning assembly; and
the transitioning assembly comprises a corresponding first airbag, a corresponding second airbag, and a corresponding blocking plate configured to be deployed on a corresponding side of the vehicle.

14. A method for deploying a safety mechanism of a vehicle, the method comprising:
detecting an object or person within a predetermined vicinity of the vehicle;
transitioning a transitioning assembly of the safety mechanism from a horizontal orientation to a vertical orientation, when an object or person is detected within the predetermined vicinity of the vehicle;
detecting whether the object or person enters into a danger zone in front of a rear wheel of the vehicle;
deploying a first airbag in front of the rear wheel of the vehicle, when the object or person enters into the danger zone in front of the rear wheel; and
deploying a second airbag and extending a blocking plate in front of the rear wheel of the vehicle, after the object or person is moved out of the danger zone by the first airbag;
wherein deployment of the second airbag causes the blocking plate to extend.

15. The method as in claim 14, wherein the transitioning assembly is transitioned to the vertical orientation from the horizontal orientation by a transitioning cable coupled between a main housing of the transitioning assembly and a motor, the motor pulling the transitioning cable.

16. The method as in claim 15, wherein when the object or person is detected to have moved out of the predetermined vicinity of the vehicle, the motor releases tension on the transitioning cable, and an elastic member coupled between the main housing of the transitioning assembly and a crossbeam of the vehicle restores the transitioning assembly to the horizontal orientation.

17. The method as in claim 14, wherein the first airbag is pulled taut by at least one first pulling cable pulling a bottom portion of the first airbag after deflating.

18. The method as in claim 14, wherein the second airbag is pulled taut by at least one second pulling cable pulling a bottom portion of the second airbag after deflating.

19. The method as in claim 14, further comprising sending out an alarm to alarm the object or person to move out of the predetermined vicinity of the vehicle, when the object or person is detected within the predetermined vicinity.

20. The method as in claim 14, wherein the predetermined vicinity is monitored when the vehicle makes a turn.

\* \* \* \* \*